United States Patent [19]
Aoyagi et al.

[11] Patent Number: 5,414,544
[45] Date of Patent: May 9, 1995

[54] DISPLAY APPARATUS

[75] Inventors: Koji Aoyagi, Kanagawa; Toshio Kimura, Saitama, both of Japan

[73] Assignee: Sony Corporation, Japan

[21] Appl. No.: 169,362

[22] Filed: Dec. 20, 1993

[30] Foreign Application Priority Data

Dec. 25, 1992 [JP] Japan .................. 4-347011

[51] Int. Cl.6 .................. G02F 1/133; G02B 27/14
[52] U.S. Cl. .......................... 359/53; 345/8; 351/158; 359/630; 359/83
[58] Field of Search .......... 359/36, 53, 40, 49, 359/83, 900, 630; 345/8; 351/158

[56] References Cited

U.S. PATENT DOCUMENTS

| | | | |
|---|---|---|---|
| 4,561,723 | 12/1985 | Hamano et al. | 359/466 |
| 4,695,129 | 9/1987 | Faessen et al. | 350/96.25 |
| 4,896,209 | 1/1990 | Matsuzaki et al. | 358/86 |
| 5,129,716 | 7/1992 | Holakovsky et al. | 351/158 |
| 5,334,991 | 8/1994 | Wells et al. | 359/630 |

FOREIGN PATENT DOCUMENTS

| | | |
|---|---|---|
| 63-197189 | 8/1988 | Japan . |
| 4-26287 | 1/1992 | Japan . |
| 2254513 | 10/1992 | United Kingdom . |

OTHER PUBLICATIONS

British Search Report.

*Primary Examiner*—Anita Pellman Gross
*Assistant Examiner*—James A. Dudek
*Attorney, Agent, or Firm*—Ronald P. Kananen

[57] ABSTRACT

Disclosed is a head-mount type display apparatus having an optical system which is of the back-irradiation type by which the user can see an extremely high-quality video image and by which the user makes only infocus adjustment thereby improving operation convenience. The head-mount type display apparatus includes at least two optical systems each including a light source, a LCD through which the light from the light source is passed, a reflecting plate which reflects the light passing through the LCD, a screen on the back side of which the reflected light from the reflecting plate is focused to form an image and a lens by which the light from the screen is focused to form an image at a viewing point, and a head-mount type member for supporting the two optical systems which are opposed to left and right eyes. According to the preferred embodiment, interference and distortion in the projected images arising from the image of the edges of the LCDs is substantially reduced.

6 Claims, 7 Drawing Sheets

DISPLAY APPARATUS

FIELD OF THE INVENTION

This invention relates to an information transmission system using, for example, a head-mounting type display apparatus, and particularly to a display apparatus suitable for use in a vehicle, vessel or airplane.

BACKGROUND OF THE INVENTION

In recent years, the number of various games using video package soft and computer graphics has increased with the proliferation of new hardware. Consequently, there is a demand for displays which vary according to the place and situations in which software is enjoyed. Such displays are used in home television receivers, projectors, portable LCD (liquid crystal display) television receivers, virtual reality HMDs (head-mounted displays) and so on.

One such hardware system which has been proposed is an information transmission system for transmitting video images, audio sound and computer data (see commonly owned U.S. Pat. No. 4,896,209, which was based on Japanese Patent Laid-Open Gazette No. 63-197189). This information transmission system, described in detail below with reference to FIG. 7, may be installed in a vehicle, vessel or airplane in order to provide various information to and from a user, such as a passenger. The information provided to a passenger includes recorded audio and video signals. stick or the like. Using the I/O unit 25b, one may select movies, music, sound volume adjustment, or, if installed in an international-line airplane, proposed duty-free articles. Generally, the selection display apparatus 25 may be mounted on the back of a seat, for example, in such a way that a passenger can watch the monitor 25a and interact with the system with the I/O unit 25b.

One drawback with such a system is the size of the monitor is limited by the area on which the monitor is located. Another drawback is the lack of privacy afforded by use of such a monitor in a crowded viewing area, such as in an airplane. Yet another drawback relates to the image provided by a single image plane.

Figure 8:
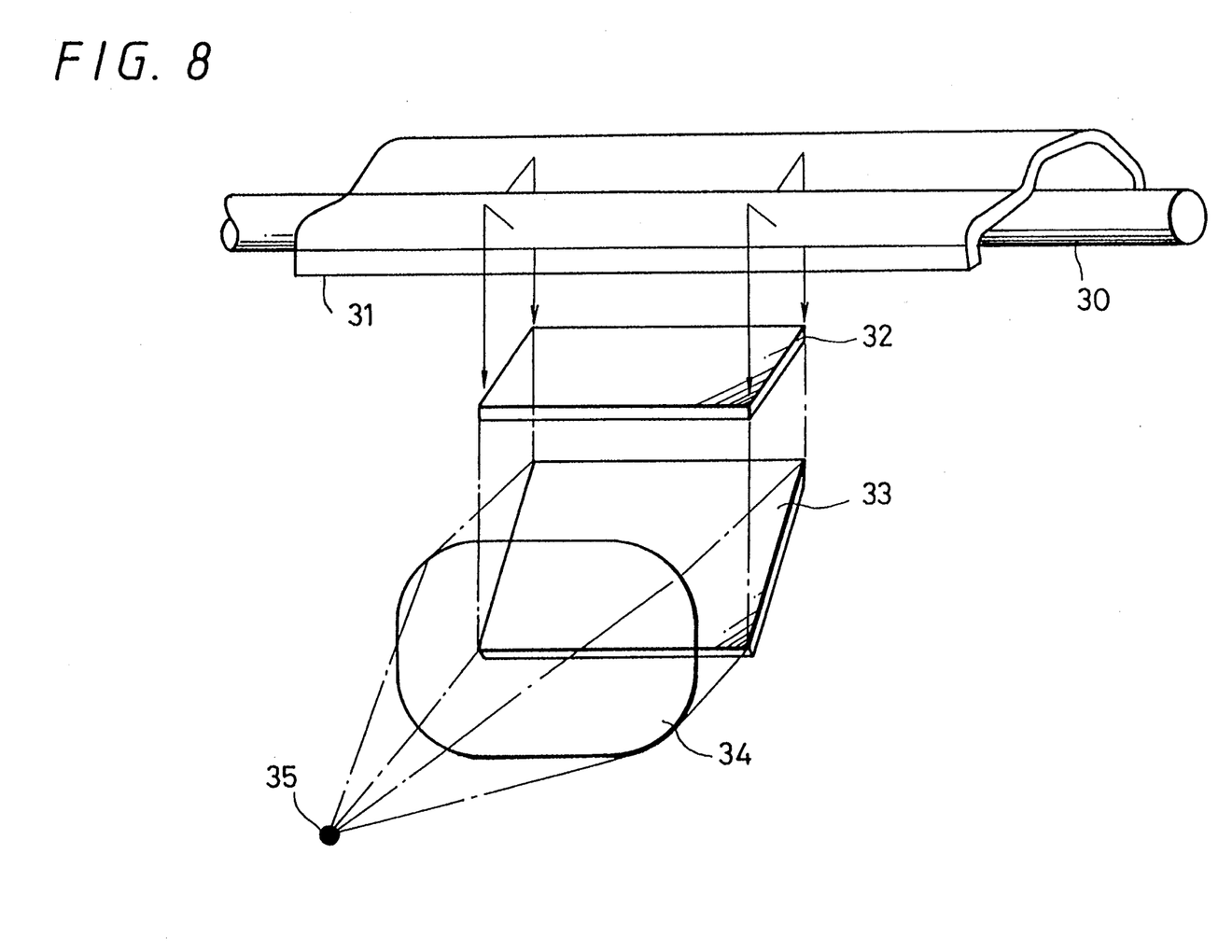
FIG. 8 is a diagram showing an optical system of a display apparatus.

In order to eliminate at least some of these drawbacks, utilization of a head-mounted type display apparatus is herein described. An optical system for a head-mount type display apparatus is shown in FIG. 8. In this drawing, there is shown a light source 30, a cover 31 having an inner side which reflects light, an LCD panel 32, a reflecting plate 33 for reflecting the light transmitted through the LCD 32, a lens 34 and a viewing point 35. The optical system shown in FIG. 8 may be provided for both the left and the right eyes.

In the optical system of FIG. 8, a video signal is supplied to the LCD 32, and the light from the light source 30 is reflected from the cover 31 incident to the LCD 32. The light penetrating through the LCD 32 is reflected from the reflecting plate 33 into the lens 34 which forms an image at the viewing point 35. Thus, the user can see the video image displayed on the LCD 32 as if he watched the image on, for example, a 33-inch type large screen.

The head-mount type display apparatus mentioned above is of the so-called direct-viewing type. Light from the light source 30 is incident to, and penetrates through the LCD 32. It is then reflected from the reflecting plate 33 and is focused by the lens 34 to form an image at the viewing point 35. As a result, it is necessary that both left and right LCDs be center- and focus-adjusted. This need for multiple adjustments proves inconvenient for a user. In addition, the image of the peripheries of the LCDs 32 are seen by the user and thereby interferes with the image to be projected.

SUMMARY OF THE INVENTION

In view of these drawbacks, this invention proposes a display apparatus which provides improved image reproduction which requires few image adjustments and which substantially reduces image distortions caused by the peripheries of the LCDs. This invention may be incorporated into an information transmission system.

According to this invention, there is provided a display apparatus comprising: at least two displays each having a light source, a LCD through which the light from the light source is passed, reflecting means for reflecting the light passing through the LCD, a screen on the back side of which the reflected light from the reflecting means is focused to form an image, viewing point determining means by which the light passing through the screen is focused to form an image at a viewing point, and holding means for supporting the two display means to left and right eyes. The holding means, with at least the two display means, is mounted on the user's head so that the user can see an image displayed on the two display means which are provided to the left and right eyes.

According to one aspect of the invention, a headphone is provided which is supported by the holding means.

According to another aspect of the invention, power and information to or from the apparatus are supplied or transmitted through seats or armrests in a vehicle, vessel or airplane.

According to yet another aspect of the invention, the displays include a plurality of LCDs which transmit red, green and blue light whereby a color image is formed.

According to still another embodiment of the invention, a light shielding member through is provided between the plurality of LCDs.

According to yet another embodiment of the invention, light splitting means are provided to split the light from the light source 40 into a plurality of separate light rays which are sequentially made incident to the plurality of LCDs.

DETAILED DESCRIPTION OF THE PREFERRED EMBODIMENT

Figure 1:
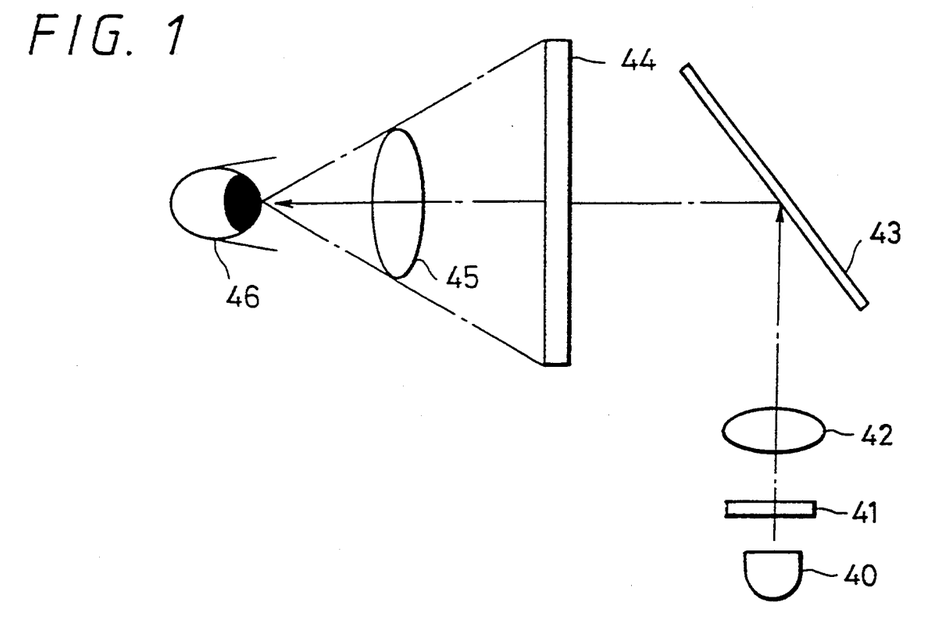
FIG. 1 is a diagram of one embodiment of a display apparatus according to the invention.

One embodiment of the display apparatus of the invention will be described in detail with reference to FIG. 1. FIG. 1 shows an optical system of a display apparatus according to this embodiment. Referring to FIG. 1, the light from a light source 40 is passed through a LCD 41 and a lens 42 incident to a reflecting plate 43. After being reflected from the reflecting plate 43, the light is projected on a screen 44 thereby forming an image which is focused by a lens 45 as an image at a viewing point 46, The light is reflected at an angle of 90° in order to present distortion of the projected image.

Figure 2:
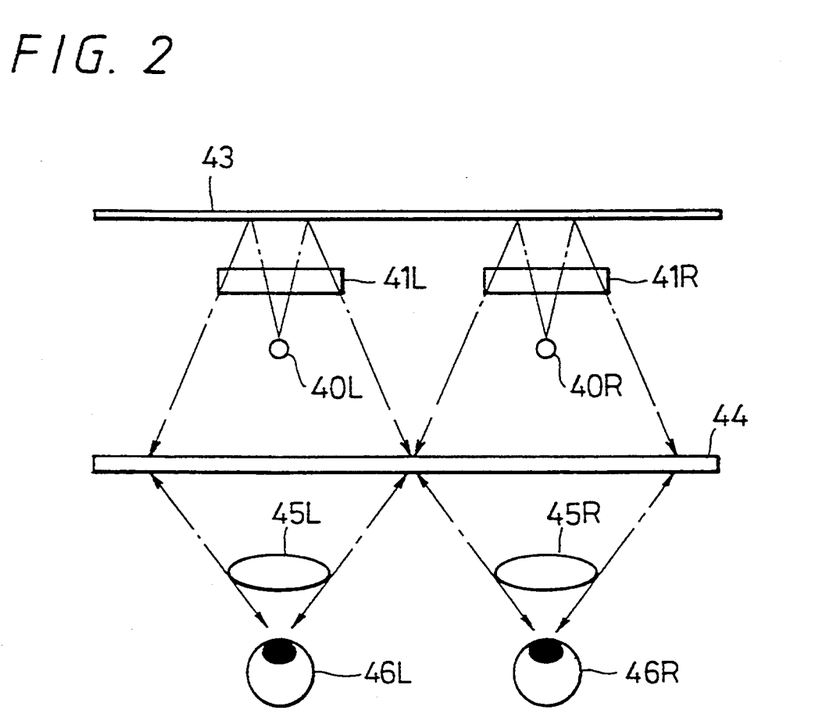
FIG. 2 is a diagram of the construction of an embodiment of the invention.

FIG. 2 shows a dual optical system according to this embodiment. In this figure, the light from a left light source 40L is passed through a LCD panel 41L, reflected from the reflecting plate 43 (for example, a mirror), and projected onto a screen 44. The light from the screen 44 is focused through a lens 45L for the left eye to form an image at a left viewing point 46L. At the same time, the light from a light source 40R is passed through a LCD panel 41R, reflected from the reflecting plate 43, and then projected on the screen 44. The light from the screen 44 is focused through a lens 45R for the right eye to form an image at a right viewing point 46R.

Thus, since the light rays from the LCDs 41L and 41R are projected on the screen 44 and viewed as a video image, the peripheries of the LCDs 41L and 41R are not seen, and thus an extremely natural-looking video image can be enjoyed. Also, since this display apparatus is not of the direct-viewing type, such as the one described with reference to FIG. 8, no center adjustment is necessary for the left and right LCDs. Thus, only the focus adjustment at the viewing points 41L and 41R is necessary, and so the inconvenience of the user is minimized. Furthermore, according to this embodiment, the user can enjoy a three-dimensional (3-D) image. The video signals for the left and right eyes can be obtained by, for example, a stereo camera for the left and right eyes.

Figure 3:
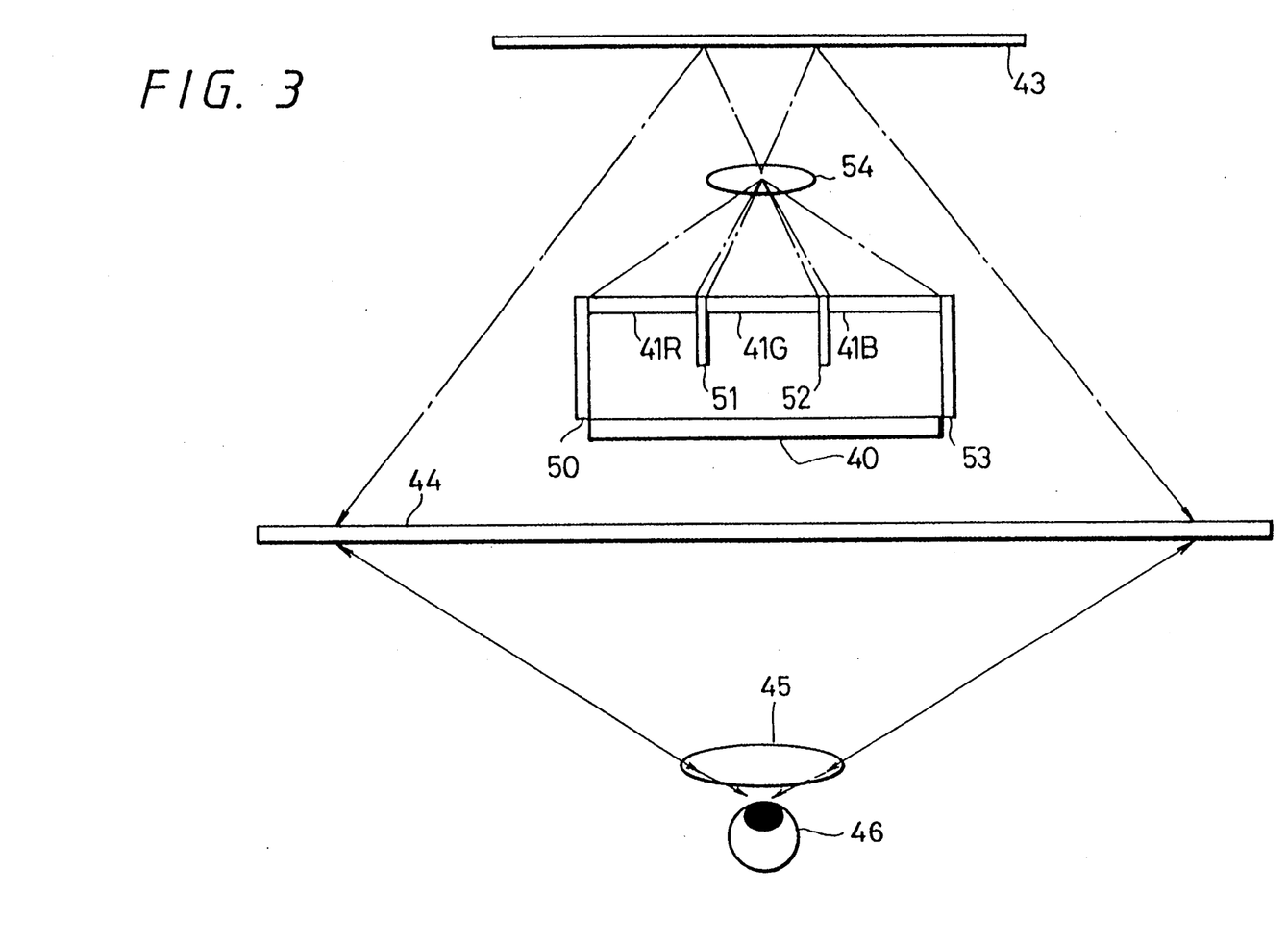
FIG. 3 is a diagram of a modification of the embodiment of the display apparatus of the invention.

FIG. 3 shows a modification of this embodiment which can provide a higher definition video image. Referring to FIG. 3, light, for example "white light" from a light source 40 is irradiated onto a red LCD 41R, a green LCD 41G and a blue LCD 41B which are isolated by light-shielding members 50, 51, 52 and 53. The color-filtered light rays transmitted through the red LCD 41R, green LCD 41G and blue LCD 41B are added by a lens 54. The composite light from the lens is reflected from the reflecting plate 43 and projected on the screen 44. The light from the screen 44 is focused by the lens 45L for the left eye to form an image at the viewing point 46L, and at the same time is focused by the lens 45R to form an image at the right viewing point 46R. Thus, it is possible to obtain an image of which the resolution is three times as high as that with a single LCD.

Figure 4:
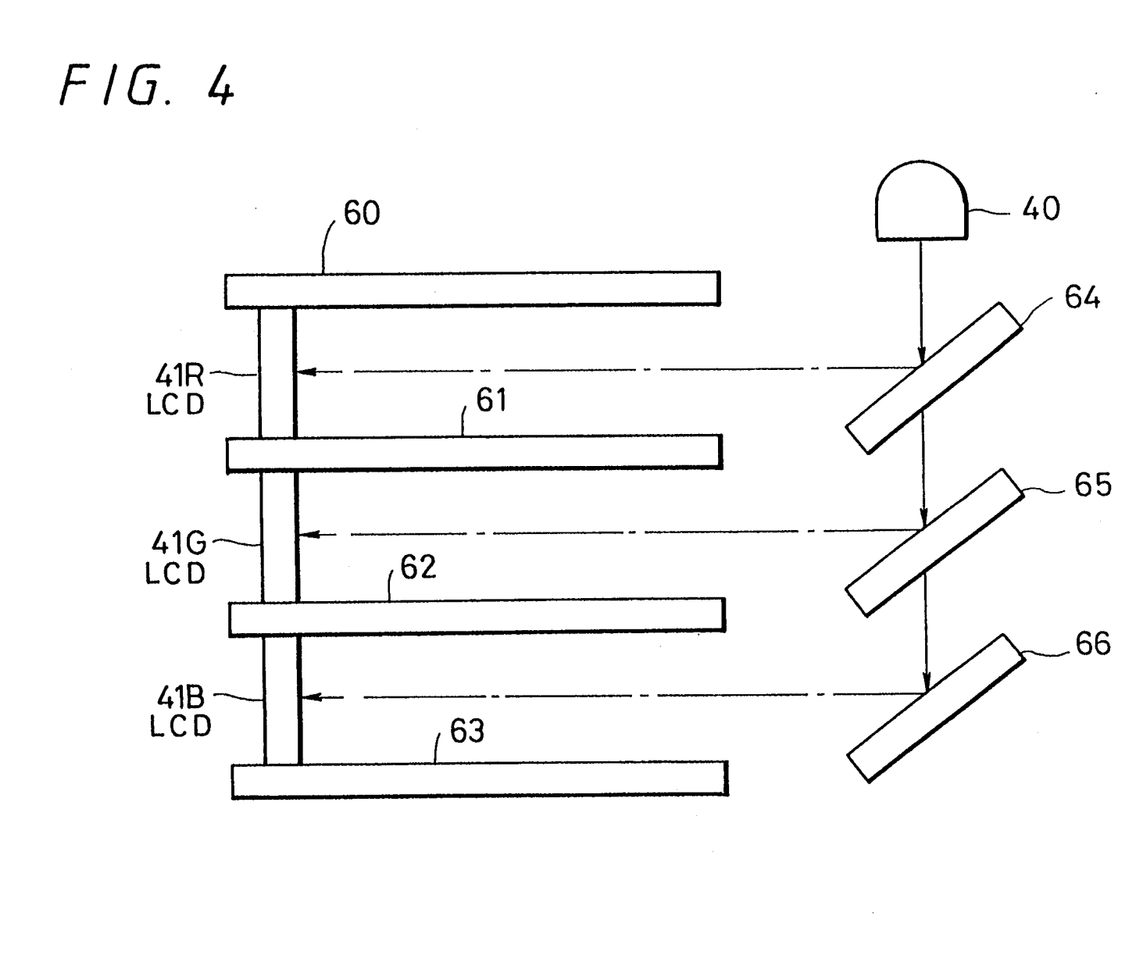
FIG. 4 is a diagram of another modification of the embodiment of the display apparatus of the invention.

FIG. 4 shows another modification of the embodiment shown in FIG. 3. In FIG. 4, the light from the light source 40 is split by mirrors 64, 65 and 66 in turn so that the intensity of each reflected ray is equal. For example, mirror 64 transmits two thirds of the light incident thereon, while reflecting one third. The light transmitted through mirror 64 is then incident on the half-mirror 65 which transmits one half this light while reflecting the other half. Finally, the light transmitted through the half-mirror 65 is incident on full mirror 66.

In this way, the light rays from the mirrors are respectively incident to the red LCD 41R, green LCD 41G and blue LCD 41B which are shielded by light shielding members 60, 61, 62 and 63. Thus, since the LCDs 41R, 41G and 41B are irradiated with uniform light, the high-definition video image can be further enhanced in its resolution.

Figure 5:
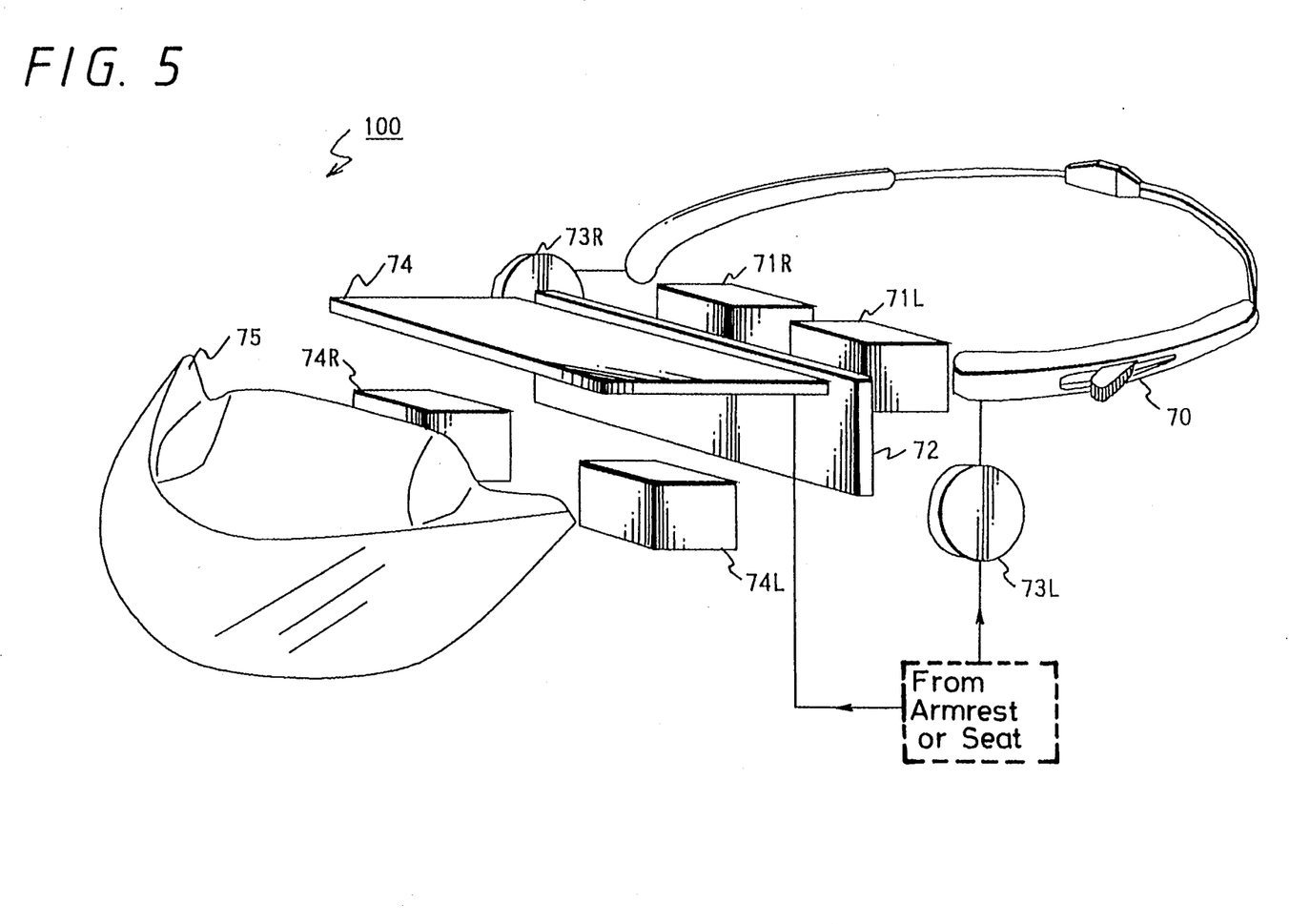
FIG. 5 is a schematic diagram of the construction of an embodiment of the invention.

The optical systems for the display apparatus mentioned with reference to FIGS. 1 through 4 are shown in FIG. 5 as applied to a head-mount type display apparatus 100. Referring to FIG. 5, there is shown a light-shielding cover 75 for blocking external light, and optical systems 74R, 74L which have lenses for the left and right eyes and which are used for in-focus adjustment. Also shown is a substrate 74 on which, for example, circuits for the input and the output of a video signal are mounted, as well as a screen 72, and optical systems 71R, 71L. The optical systems may be formed of LCDs for the left and right eyes, reflecting plates, light sources and lenses as taught above.

In addition, there are shown headphones 73R, 73L of, for example, a rewindable-cord type for the right and left eyes, and a head-mount member 70 for holding these parts and which is mounted on the head of the user. Both the audio input provided to the headphones 73R and 73L, as well as video signal input provided to substrate 74 may be connected to a passenger seat or armrest, for example, as indicated in the drawing.

According to this embodiment the display apparatus may include a small-sized lightweight personal LCD monitor which is worn on the head of the user like goggles in ski to easily enjoy forceful sound and video image. If used in place of, for example, the selection display apparatus 25 of FIG. 7, the above-mentioned system can be installed even on the relatively narrow, economy seats in airplanes or other vehicles.

While different embodiments may be used without departing from the scope of the invention, in a preferred embodiment, this head-mount type display apparatus employs two high-resolution LCDs of 0.7 inch/103 thousand pixels for the right and left eyes, respectively. The magnified images displayed from the separate left and right LCDs take advantage of the fusion action of the human sense of sight. The sense-of-sight mechanism processes the images entering each eye as separate pieces of information which are superimposed into one image. Thus, the user can enjoy a forceful, large image which is equivalent, for example, to the 33-inch type screen for an average eye width of 65 mm. Moreover, as mentioned above, this head-mount type display apparatus employs separate left and right LCDs, and thus can be used for a 3-D monitor for three-dimensional images.

Further, according to a preferred embodiment, this head-mount type display apparatus weighs only about 250 grams. Moreover, rectangular and non-spherical plastic lenses are used in order for the main body to be small-sized and lightweight. Also, since the central part and peripheral part of the lens are designed to have different focal distances, the image on the LCD can be prevented from being distorted when magnified, and thus a completely sharp video image can be realized.

In addition, the preferred head-mount type display apparatus were engineered with regards to optical strength adjustment, mounting position and so forth with reference to average measured values of heads and faces of about fifty male and female persons. Since the vision of human eyes varies greatly among different people, it is necessary that the vision of a person without glasses be adjusted over a wide range of +2 through −10 dpt (the unit of the degree at which the flux of light rays exiting from the eyepiece converges or diverges). The general optical strength adjustment is made by moving the eyepiece, while the head-mount type display apparatus makes an adjustment by moving the LCD itself within the optical unit without changing the distance between the eyepiece and the eye. Therefore, the field angle can be maintained constant in any adjustment position, and thus the image obtained is easy to see and is stable.

Furthermore, this head-mount type display apparatus according to the preferred embodiment of the invention can be mounted on the head of the user by use of a head band which is adjustable to the size of the head, and a forehead pad which can be set to make constant the distance between the eye and the eyepiece irrespective of the different shapes of faces and heads of the users. Since the head-mount type display apparatus can be securely fixed at a plurality of points as mentioned above, the mounting pressure upon use can be dispersed, and thus the feeling of mounting is stable and comfortable.

Moreover, the head-mount type display apparatus includes a rewindable-cord inner-ear type stereo headphone incorporated in its main body. This permits the user to enjoy realistic stereo sound with realism in addition to the video image.

Figure 7:
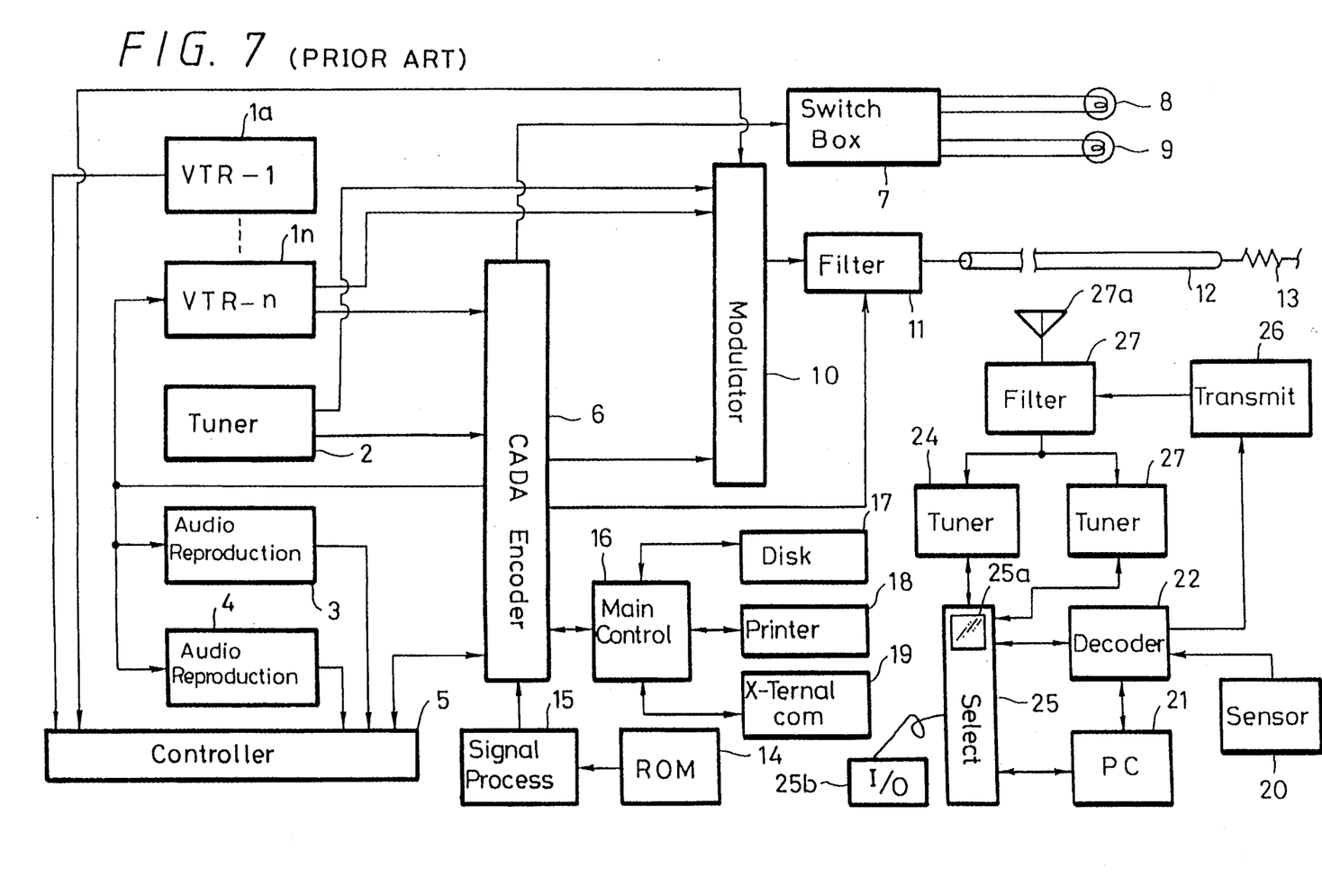
FIG. 7 is a diagram of an information transmission system using a conventional display apparatus.

As mentioned above, FIG. 7 shows a conventional transmission system which may be modified so as to be used in conjunction with the present invention. FIG. 7 shows video tape recorders 1a through in which are provided to video image displays located, for example in the crew's cabin of a vehicle, vessel or airplane. The video tape recorder 1a is used for override, and has loaded therein a recorded cassette tape which describes, for example, how to wear a life preserver or the like. The video tape recorders 1b (not shown) through in have loaded therein recorded cassette tapes of movies.

These video tape recorders 1a through In have video output terminals for reproduced video signals and audio output terminals for reproduced audio signals (not shown). The video tape recorders la through In are able to produce bilingual outputs. For example, three audio output terminals are provided on each recorder; the two terminals for the left and right audio signals of a first language, and the third terminal for the monaural audio signal of a second language. In addition, a television tuner 2 has provided thereon a video output terminal and audio output terminals (L and R). The output terminals L and R are for the left and right audio signals, respectively.

Although not shown, a still-image reproducer is also provided for reproducing recorded compact disks, or CD-ROMs for maps, and guides for tours, air terminal buildings and so on. This still-image reproducer has provided thereon a video output terminal for still images, and audio output terminals.

There is also shown an audio reproducer 3 having three compact disk players (CD players) and an audio reproducer 4 having three tape recorders. These audio reproducers 3 and 4 have provided thereon six pairs (L and R) of audio output terminals. The output terminals L and R are for the left and right audio signals. Reference numeral 5 represents a controller, which has, though not shown, a microphone, a volume control for the microphone, an announce key, an override key, pause keys for causing the video tape recorders 1a through 1n to pause, and so on.

The video signal and audio signal from the video and audio output terminals of the video tape recorder 1a are supplied to the controller 5. The controller 5 has output terminals provided for video signals and audio signals. The video signal and audio signal produced at the video terminal and audio terminal of the video tape recorder are normally produced at the output terminals of the controllers. When the override is activated by pressing the override key, the controller produces at those terminals the video signal and audio signal which are reproduced from the video and audio terminals of the video tape recorder 1a. When the announce is turned on by pushing the announce key, the audio signal from the microphone is produced.

Shown at 6 is a CADA encoder which is used in a cable-digital-audio-data/transmission system (CADA system). The CADA system transmits a plurality of, for example, digital audio signals in a time sharing manner on a single free television channel of a frequency band (6 MHz) of CATV, and thus can transmit music signals or the like at a very high efficiency without losing sound quality. The CADA encoder 6 comprises an A-D converter and a shift register. It converts a plurality of audio signals into digital signals by use of the D-A converter and supplies those digital signals to certain positions of the shift register in parallel. This shift register produces these signals in series, or in a time sharing manner, at a high speed. It can transmit not only the digital audio signals, but also control data and computer data in a time sharing manner.

The audio signal produced at the audio output terminal of the controller 5 and the audio signals produced at the output terminals of the video tape recorders 1c through 1n are supplied to the CADA encoder 6. The audio signals produced at the audio output terminal of the tuner 2 and at the output terminal of the still picture reproducing apparatus are supplied to the encoder 6. In addition, the audio signals from the six pairs of output terminals of the audio reproducing apparatus 3 and from the three pairs of output terminals of the audio reproducing apparatus 4 are supplied through the controller 5 to the encoder 6. Moreover, when the override key, announce key or pause key of the controller 5 are pushed, the controller 5 generates control data corresponding to the pressed key and supplies this control data to the encoder 6.

The encoder 6 has an output terminal from which a pause control signal is produced according to the control data. The pause signal from the output terminal controls the video tape recorders 1b through in and audio reproducing apparatus 3 and 4. In other words, when the override key and announce key are pushed, the pause control signal is produced at the output terminal, controlling the video tape recorders 1b through 1n and audio reproducing apparatus 3 and 4 to be all in the pause state. When the pause key is pushed, the pause control signal is produced at the output terminal, controlling the video tape recorders 1b through 1n to pause.

Shown at 16 is a main control circuit formed of a computer for controlling the airplane system. This main control circuit 16 generates control data for controlling the terminal apparatus on the receiving side. This control data is fed to the encoder 6. The control data includes data for controlling the brightness of the display of the terminal apparatus in accordance with, for example, the brightness of the room, data for demanding the data indicative of the state of the terminal apparatus, and so on.

Shown at 14 is a ROM which has menu data and various game data stored therein. The data for computer software read from this ROM 14 is supplied to a signal processor 15, where it is added with an error correction code. The output data from the processor is supplied to the encoder 6. A time-sharing multiplex signal of digital data into which a plurality of input audio signals are converted and control data is produced at the output terminal of the encoder 6. This signal is supplied to a modulator 10 where it is amplitude-modulated in a VSB (vestigial sideband) system.

In addition, a time-sharing multiplex signal of digital data into which a plurality of input audio signals, control data and computer software data are converted is produced at the other output terminal of the encoder 6. This signal is fed to the modulator 10, where it is amplitude-modulates in the VSB system.

The video signal produced at the output terminal of the controller 5 is supplied to the modulator 10, and the audio signal produced at the output terminal of the controller 5 is supplied to the modulator 10. In the modulator 10, the audio signal is frequency-modulated and frequency-multiplexed with the video signal into the normal television signal, which is then amplitude-modulates in the VSB system.

The video signals produced at the video output terminals of the video tape recorders 1b through 1n, tuner 2 and still picture reproducing apparatus not shown are supplied to the modulator 10, and amplitude-modulated in the VSB system. In the modulator 10, these multiplex signals are modulated on the frequency bands of, for example, 60 or more television broadcasting channels at every second channels for preventing cross modulation.

The output signal from the modulator 10 is supplied to the adder, not shown, within the modulator 10, and frequency-multiplexed. The frequency-multiplex signal from the adder is supplied through a branching filter 11 to one end of a leaky cable 12 constituting bi-directional signal transmission means. The other end of this leaky cable 12 is connected to a terminal resistor 13. This leaky cable 12 is, for example, a coaxial cable having a spiral cut around the periphery for the purpose of increasing the amount of leaking signal.

The terminal apparatus includes a sensor 20, a personal computer 21, a decoder 22, a tuner 23, a tuner 24, a selection display apparatus 25 having a monitor 23a, an input output unit 25b, a transmission circuit 26, a branching filter 27 and an antenna 27a. This terminal apparatus is provided at, for example, each of the seats for passengers in an airplane. Only one terminal apparatus is shown. In this terminal apparatus, the antenna 27a catches the frequency multiplex signal caught by this antenna 27a is supplied through the branching filter 27 to the television tuner 24 and the CADA tuner 23.

The tuner 24 is constructed to select and receive the channels of the output frequency bands from the modulator 10, and the tuner 23 is constructed to select and receive the channels of the output frequency bands from the modulator 10. The selection display apparatus 25 controls the tuners 24 and 23 to tune to the channels.

The video signal and audio signal produced from the tuner 24 are supplied to the selection display apparatus 25, and the time-sharing multiplex signal produced from the tuner 24 is supplied to the CADA decoder 22. The CADA decoder 22 is constructed to make the operation substantially opposite to the CADA encoder 6, deriving the control data, a desired audio signal according to the control of the selection display apparatus 25 and data for computer software from the time-sharing multiplex signal.

In other words, the CADA decoder 22 has a shift register and a D-A converter. The time-sharing multiplex signal is serially supplied to the shift register. The control data are derived in parallel from predetermined positions of the shift register, and a desired audio signal and data for computer software are also derived in parallel from predetermined positions of the shift register under the control of the selection display apparatus 25.

In this case, the audio signal is converted into an analog signal by the D-A converter. This D-A converter is formed of two D-A converters for stereo. The audio signal produced from the CADA decoder 22 is supplied to the selection display apparatus 25. Also, the audio signal produced from the CADA decoder 22 is supplied to the selection display apparatus 25. In addition, the data for computer software produced from the CADA decoder 22 is supplied to the personal computer 21, and stored in the RAM.

The selection display apparatus 25 includes the monitor 25a. Thus, a menu image is displayed on the faceplate of the monitor 25a (or display screen of LCD) by the input/output unit 25b such as a joy stick or the like. If the selection display apparatus is installed in, for example, an international-line airplane, proposals for duty-free articles, selection of movies, selection of music, adjustment for sound volume or brightness and so on can be made on the menu. In addition, since the selection display apparatus 25 is mounted on the back of the seat, the passenger can watch and operate the monitor 25a of the selection display apparatus 25 mounted on the back of the previous seat before his seat.

Figure 6:
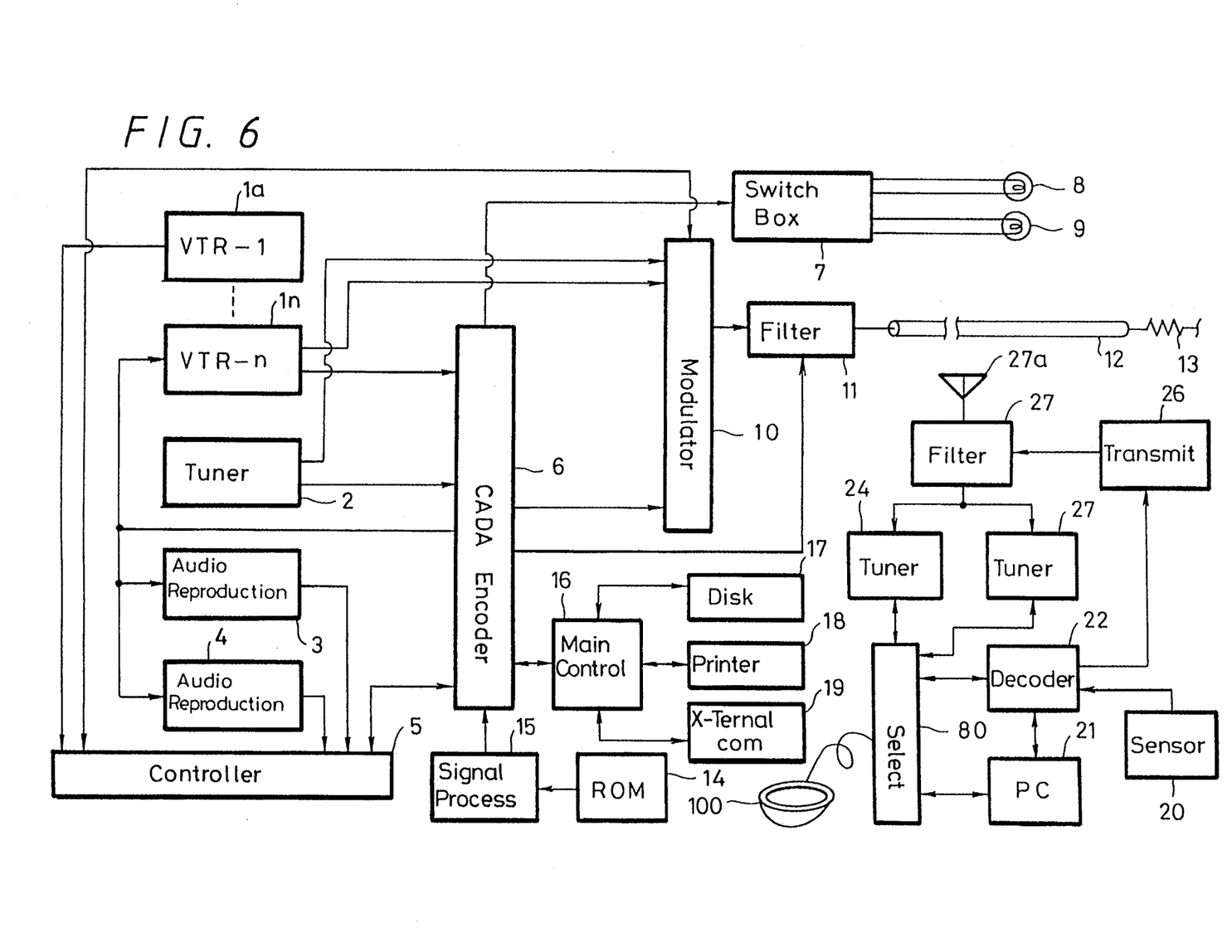
FIG. 6 is a diagram of a transmission system according to an embodiment of the invention.

FIG. 6 shows a modification of such an information transmission system so as to included a head-mount type display apparatus 100, such as the one according to the disclosure above. In FIG. 6, like elements corresponding to those in FIG. 7 are identified by the same reference numerals and will not be described in detail. In FIG. 6, a selection apparatus 80 is provided in place of the selection display apparatus 25 shown in FIG. 7 so that it can select the input and output to and from the tuners 21 and 23 and decoders 22 and 21, and the display apparatus 100 shown in FIG. 5 is provided in place of the monitor 25a.

This selection apparatus 80 has input devices, not shown, such as a joy stick and card reader. If this joy stick is operated on the menu image displayed on the LCD of the display apparatus 100, it will be possible to, for example, ask for duty-free articles, pay for those (use a card reader) and to select and enjoy movies and music in an airplane.

Now that a preferred embodiment of the invention has been described, its various advantages should be apparent to those of skill in the art. In particular, since the optical system of the head-mount type display apparatus 100 in this embodiment is of the back irradiation type, the peripheries of the LCDs are not seen, and thus the video image has an extremely high quality. In addition, since only the in-focus adjustment is used, the user is not inconvenienced.

When this display apparatus is used in the information transmission system which is installed in, for example, an airplane, it can be provided even on the narrow-space seats of economy seats, and thus the user can see high-quality video images and enjoy a comfortable journey. By providing head-mounted holding means and at least two display means to the left and right eyes so that the user can see the image displayed on the display means, the user can enjoy the video image while sitting within the smallest space. Moreover, according to this invention, since a headphone is provided in addition to the display means and supported by the holding means, the user can enjoy a video image with realism, even in a confined area.

Furthermore, the embodiment in which light is passed through a plurality of LCDs for red, blue and green images provides a high resolution, color image. By utilizing light splitting means to split the light incident to the plurality of LCDs, it is not necessary to provide a plurality of light sources, thereby maintaining a small-size and a reduced weight.

The foregoing description of a preferred embodiment of the invention has been presented for purposes of illustration and description. It is not intended to be exhaustive or to limit the invention to the precise form disclosed. Many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

What is claimed is:

1. A head mounted display apparatus for displaying a video image comprising:
    a display member including:
        light source means for emitting light;
        a pair of liquid crystal displays, each receiving light from said light source means and passing therethrough a part of the received light on the basis of the desired video image thereby projecting a corresponding pair of light images which correspond to said video image;
        reflecting means for receiving the pair of light images projected from the pair of said liquid crystal displays and reflecting the same;
        a single screen having first and second sides, said first side receiving the pair of light images reflected by said reflecting means and said second side projecting said pair of light images; and
        means for focusing the pair of light images projected from said single screen onto the eyes of a user; and
    holding means for securing said display member to the head of the user.

2. The head mounted display apparatus according to claim 1, further comprising a headphone attached to said, holding means.

3. The head mounted display apparatus according to claim 1, further comprising an input terminal operative to connect signal lines of a seat of a vehicle for receiving the video image and a power supply therethrough.

4. The head mounted display apparatus according to claim 1, wherein each said pair of liquid crystal displays has three liquid crystal display devices each for projecting red, green and blue images, respectively so that a color video image is displayed on the screen.

5. The head mounted display apparatus according to claim 4, further comprising light shielding means provided between said light source and each said liquid crystal display for separating the light from said light source so that each separated light is made incident to each said liquid crystal displays.

6. The head mounted display apparatus according to claim 4, further comprising means for splitting and transmitting said light from said light source, said means for splitting and transmitting being positioned in an optical path between said light source and each said pair of liquid crystal displays and splitting said light such that a substantially equal amount of light is incident on each of said three liquid display devices.

* * * * *